(12) United States Patent
Payne et al.

(10) Patent No.: US 11,404,176 B2
(45) Date of Patent: Aug. 2, 2022

(54) NUCLEAR FUEL ASSEMBLY SUPPORT FEATURE

(71) Applicant: WESTINGHOUSE ELECTRIC COMPANY LLC, Cranberry Township, PA (US)

(72) Inventors: Nathan J. Payne, West Columbia, SC (US); Jeffrey M. McCarty, Cayce, SC (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 377 days.

(21) Appl. No.: 16/448,385

(22) Filed: Jun. 21, 2019

(65) Prior Publication Data

US 2019/0326025 A1    Oct. 24, 2019

Related U.S. Application Data

(62) Division of application No. 14/715,646, filed on May 19, 2015, now Pat. No. 10,438,704.

(60) Provisional application No. 62/096,017, filed on Dec. 23, 2014.

(51) Int. Cl.
　　*G21C 3/34*　　(2006.01)
　　*G21C 3/33*　　(2006.01)
　　*G21C 3/356*　(2006.01)

(52) U.S. Cl.
　　CPC .............. *G21C 3/34* (2013.01); *G21C 3/33* (2013.01); *G21C 3/3305* (2013.01); *G21C 3/3315* (2013.01); *G21C 3/3563* (2013.01); *Y02E 30/30* (2013.01)

(58) Field of Classification Search
　　CPC . G21C 3/33; G21C 3/332; G21C 3/34; G21C 3/352
　　See application file for complete search history.

(56) References Cited

U.S. PATENT DOCUMENTS

| | | |
|---|---|---|
| 4,839,136 A | 6/1989 | Demario et al. |
| 4,859,407 A | 8/1989 | Nylund |
| 4,897,241 A | 1/1990 | Anthony |
| 8,712,004 B2 | 4/2014 | Robin |
| 2011/0044373 A1 | 2/2011 | Lagakos et al. |
| 2013/0251089 A1* | 9/2013 | Liebier ............... G21C 3/3563 376/442 |
| 2014/0064435 A1* | 3/2014 | Blavius ................ G21C 3/34 376/441 |

FOREIGN PATENT DOCUMENTS

| | | |
|---|---|---|
| EP | 0387653 B1 | 1/1995 |
| JP | 6-3470 A | 1/1994 |
| JP | H10170677 A | 6/1998 |

OTHER PUBLICATIONS

Westinghouse Electric Company LLC, PCT/US2015/059831 International Search Report, dated Apr. 18, 2016, 12 pages.

* cited by examiner

*Primary Examiner* — Sharon M Davis
(74) *Attorney, Agent, or Firm* — K&L Gates LLP

(57) ABSTRACT

A nuclear fuel assembly having lateral support provided by a bimetallic spring that extends from a side of the fuel assembly under certain core conditions to pressure against an adjacent component and withdraws under other core conditions, such as shutdown, to enable the nuclear fuel assembly to be aligned or withdrawn from the core and repositioned.

17 Claims, 11 Drawing Sheets

NUCLEAR FUEL ASSEMBLY SUPPORT FEATURE

CROSS REFERENCE TO RELATED APPLICATION

This divisional patent application claims the benefit of priority under 35 U.S.C. § 119(e) from U.S. patent application Ser. No. 14/715,646, filed May 19, 2015, entitled A NUCLEAR FUEL ASSEMBLY SUPPORT FEATURE, which claims priority to U.S. Provisional Patent Application Ser. No. 62/096,017, filed Dec. 23, 2014, entitled A NUCLEAR FUEL ASSEMBLY SUPPORT FEATURE.

BACKGROUND

1. Field

This invention relates in general to nuclear fuel assemblies and more particularly to a support feature for laterally supporting a Nuclear Fuel Assembly.

2. Related Art

The primary side of nuclear reactor power generating systems which are cooled with water under pressure comprises a closed circuit which is isolated and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above described loops are connected to a single reactor vessel 10 by reactor coolant piping 20.

The core 14 comprises a large number of fuel assemblies. FIG. 2 shows an elevational view, represented in vertically shortened form, of a fuel assembly being generally designated by reference character 22. The fuel assembly 22 is the type used in a pressurized water reactor and has a structural skeleton which, at its lower end includes a bottom nozzle 58. The bottom nozzle 58 supports the fuel assembly 22 on a lower core support plate 60 in the core region of the nuclear reactor (the lower core support plate 60 is represented by reference character 36 in FIG. 2). In addition to the bottom nozzle 58, the structural skeleton of the fuel assembly 22 also includes a top nozzle 62 at its upper end and a number of guide tubes or thimbles 54, which extend longitudinally between the bottom and top nozzles 58 and 62 and at opposite ends are rigidly attached thereto.

The fuel assembly 22 further includes a plurality of transverse grids 64 axially spaced along and mounted to the guide thimbles 54 (also referred to as guide tubes) and an organized array of elongated fuel rods 66 transversely spaced and supported by the grids 64. Although it cannot be seen in FIG. 3 the grids 64 are conventionally formed from orthogonal straps that are interleafed in an egg-crate pattern with the adjacent interface of four straps defining approximately square support cells through which the fuel rods 66 are supported in transversely spaced relationship with each other. In many conventional designs springs and dimples are stamped into the opposing walls of the straps that form the support cells. The springs and dimples extend radially into the support cells and capture the fuel rods therebetween exerting pressure on the fuel rod cladding to hold the rods in position. Also, the assembly 22 has an instrumentation tube 68 located in the center thereof that extends between and is mounted to the bottom and top nozzles 58 and 62. With such an arrangement of parts, fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor. The cladding which surrounds the pellets functions as a barrier to prevent the fission by-products from entering the coolant and further contaminating the reactor system.

To control the fission process, a number of control rods 78 are reciprocally moveable in the guide thimbles 54 located at predetermined positions in the fuel assembly 22. Specifically, a rod cluster control mechanism 80 positioned above the top nozzle 62 supports the control rods 78. The control mechanism has an internally threaded cylindrical hub member 82 with a plurality of radially extending flukes or arms 52. Each arm 52 is interconnected to the control rods 78 such that the control rod mechanism 80 is operable to move the control rods vertically in the guide thimbles 54 to thereby control the fission process in the fuel assembly 22, under the motive power of control rod drive shafts 50 (shown in phantom) which are coupled to the control rod hubs 80, all in a well-known manner.

The pressurized water reactor fuel assemblies 22 are thus long elongated structures that are supported within a core 14 of a nuclear reactor at their lower ends by a bottom nozzle 58 that has holes that sit on pins that extend from the upper surface of a bottom core plate 60 and are supported at their upper ends by alignment pins that fit in holes in the surface of the underside of an upper core support plate. Some space exists between fuel assemblies for the passage of coolant. There have been instances of upper core plate alignment pins being bent during reactor internals reassembly after the reactor core has been accessed for maintenance. These pins have to be removed before the upper core plate can be reseated over the fuel assemblies. Reseating of the upper core plate after the alignment pins have been removed can result in the fuel assembly for that location being misaligned. The plant then typically has to impose a power penalty for that misalignment, which can be significant. The top nozzle pop out spring 48 provides some alignment to that core location during operation because the fuel assembly is supported by the adjacent assemblies. Also, Fuel assembly to fuel assembly gaps allow for impact between fuel assemblies, resulting in increased impact loads on spacer grids during Seismic/LOCA events. However, some gap between fuel assemblies during outages is desirable to facilitate fuel handling. A need exists to reduce or eliminate the gap only during reactor operation while enabling some clearance between fuel assemblies during outages in which the assemblies need to be moved.

SUMMARY

This invention achieves the foregoing objectives by providing a nuclear fuel assembly having an elongated dimension and comprising a plurality of interconnected components. At least some of the interconnected components comprise: a top nozzle; a bottom nozzle; a plurality of guide thimbles extending between the top nozzle and the bottom nozzle; and a plurality of grids arranged in a tandem spaced relationship that extends between the top nozzle and the bottom nozzle along the elongated dimension, with each of the grids having a plurality of cells some of which support fuel rods and others through which the guide thimbles respectively pass and attach to the grid. At least some of the interconnected components have a peripheral surface area that extends in a plane a distance along the elongated dimension. At least some of the interconnected components have a bimetallic spring that moves between a first and second position relative to the plane as the fuel assembly transitions in a reactor core from a shutdown temperature to an operating temperature, with one of the first and second positions placing the bimetallic spring in contact with an adjoining component of the reactor core. In one embodiment, the bimetallic spring does not extend substantially out of the plane at temperatures substantially below the nuclear reactor operating temperature and protrudes outwardly from the nuclear fuel assembly at operating temperatures of the nuclear reactor to an extent to contact the adjoining component of the core of the nuclear reactor.

In another embodiment, the bimetallic spring is placed on a border grid strap at a mid-grid location and in another embodiment, the bimetallic spring is supported on an upper or lower border grid strap or both the upper and lower border grid strap. In still another embodiment, the bimetallic spring is supported on the top nozzle. The bimetallic spring may be a circular disc shape, optionally with relief holes or it may have an elongated rectangular shape. The rectangular shape may be oriented horizontally or vertically.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
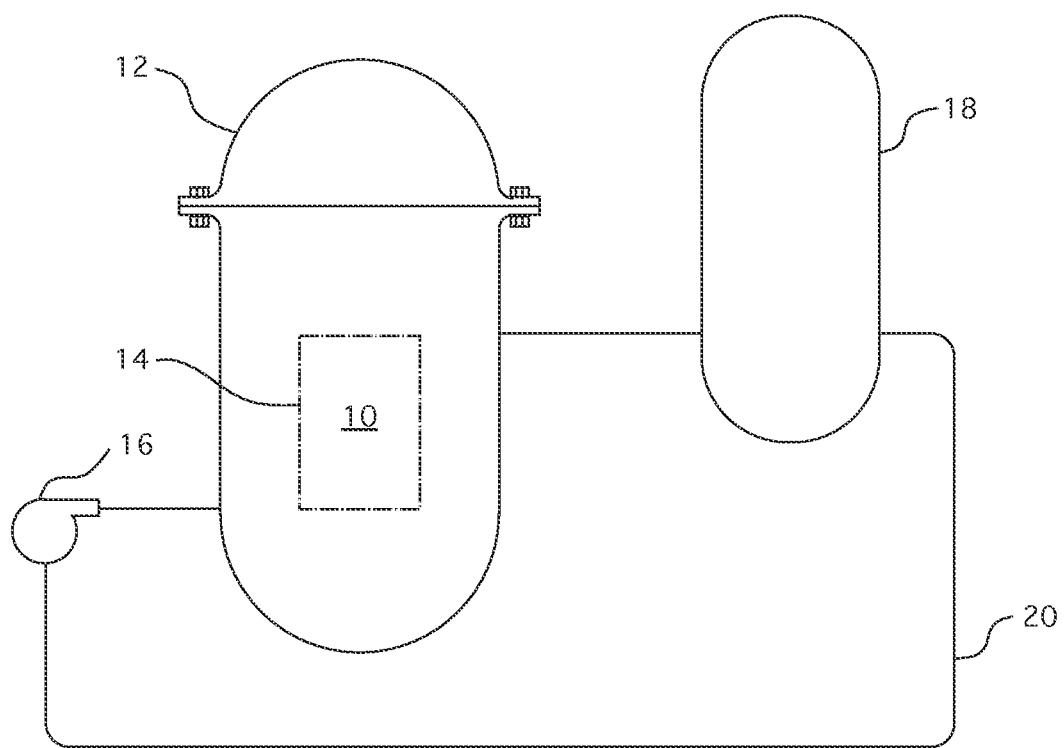
FIG. 1 is a simplified schematic of a nuclear reactor system to which this invention can be applied.
Figure 2:
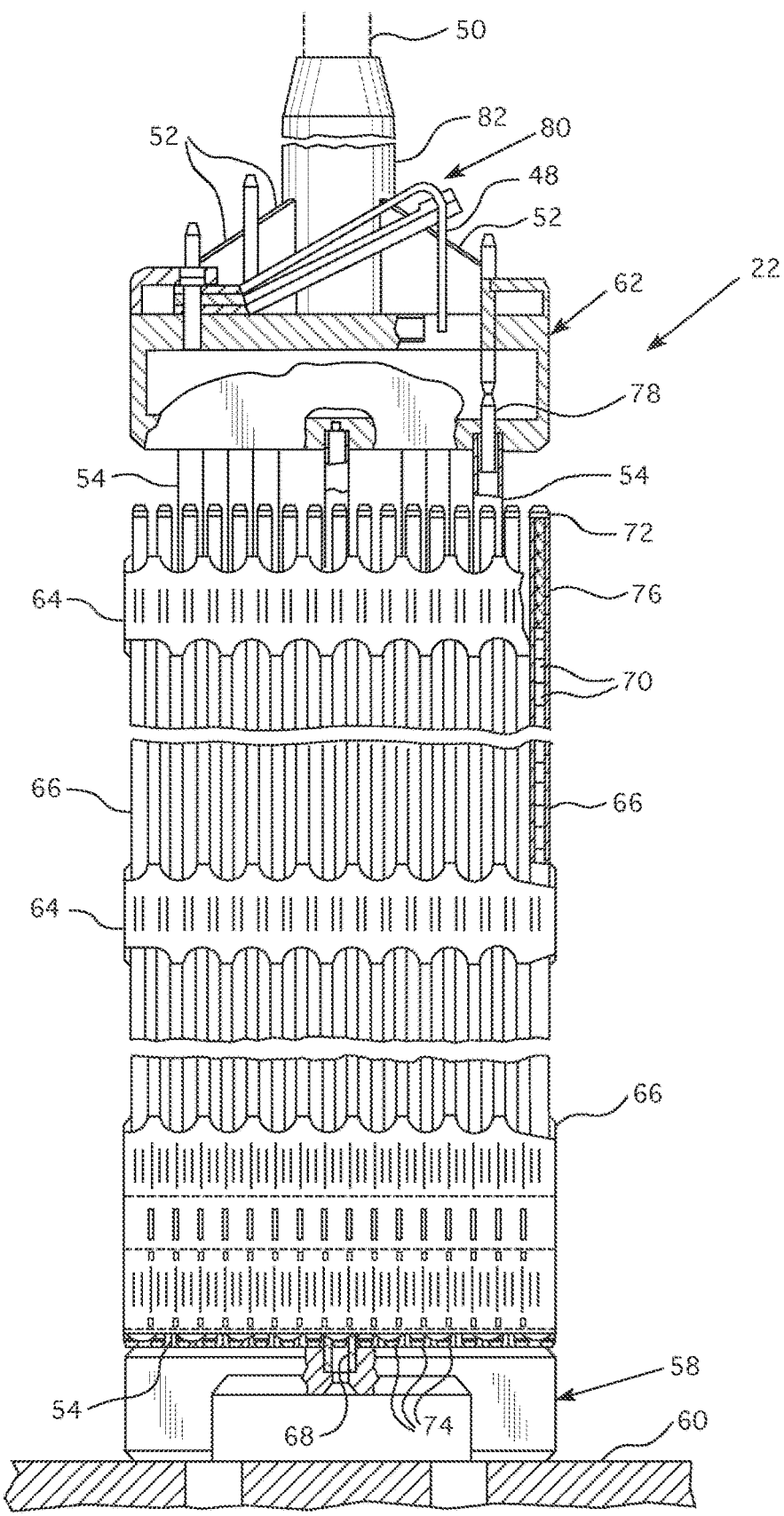
FIG. 2 is an elevational view, partially in section, of a fuel assembly illustrated in vertically shortened form, with parts broken away for clarity.
Figure 3:
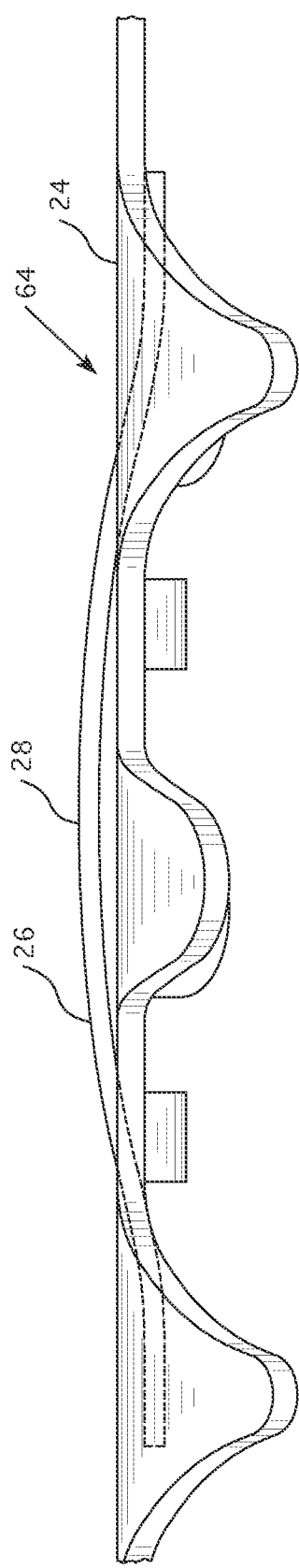
FIG. 3 is a plan view of a corner portion of a border grid strap with one embodiment of the bimetallic spring of this invention shown protruding outward away from the interior of the fuel assembly as the spring would protrude as the reactor is brought up to power.
Figure 4:
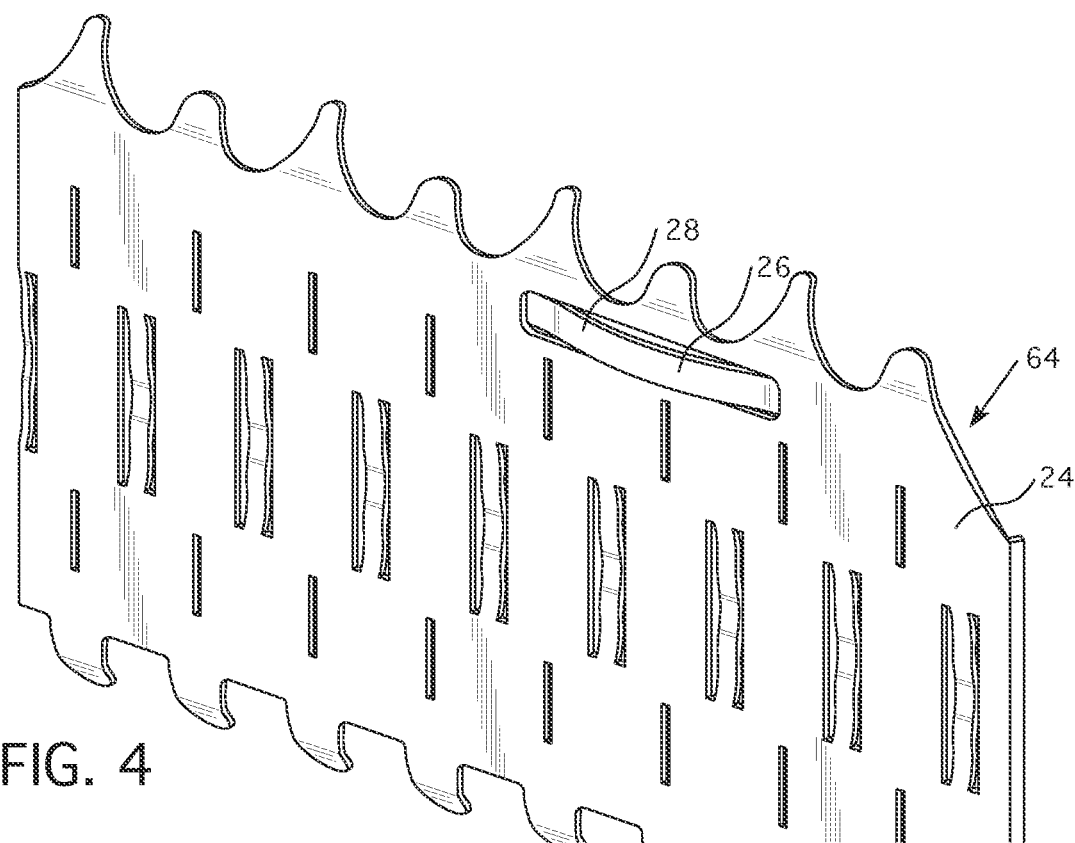
FIG. 4 is a side view of the outside of the portion of the border grid strap shown in FIG. 3.
Figure 5:
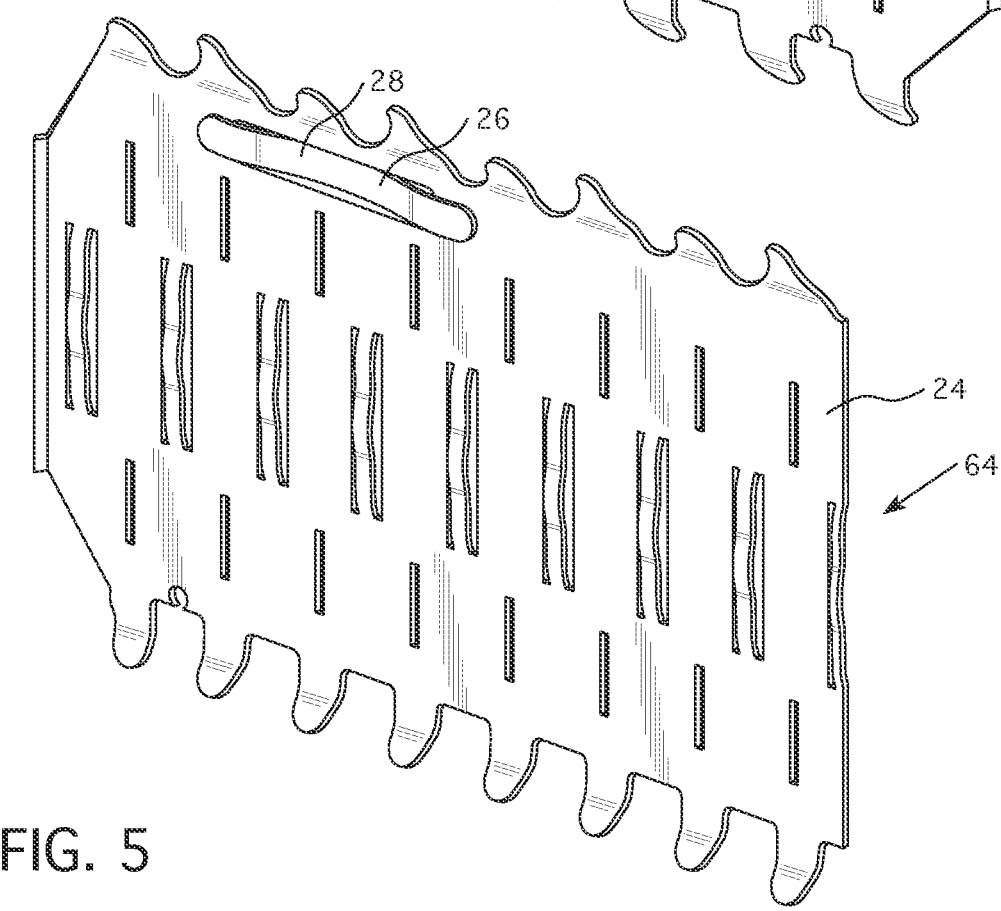
FIG. 5 is a side view of the inside of the portion of the border grid strap shown in FIG. 3.
Figure 6:
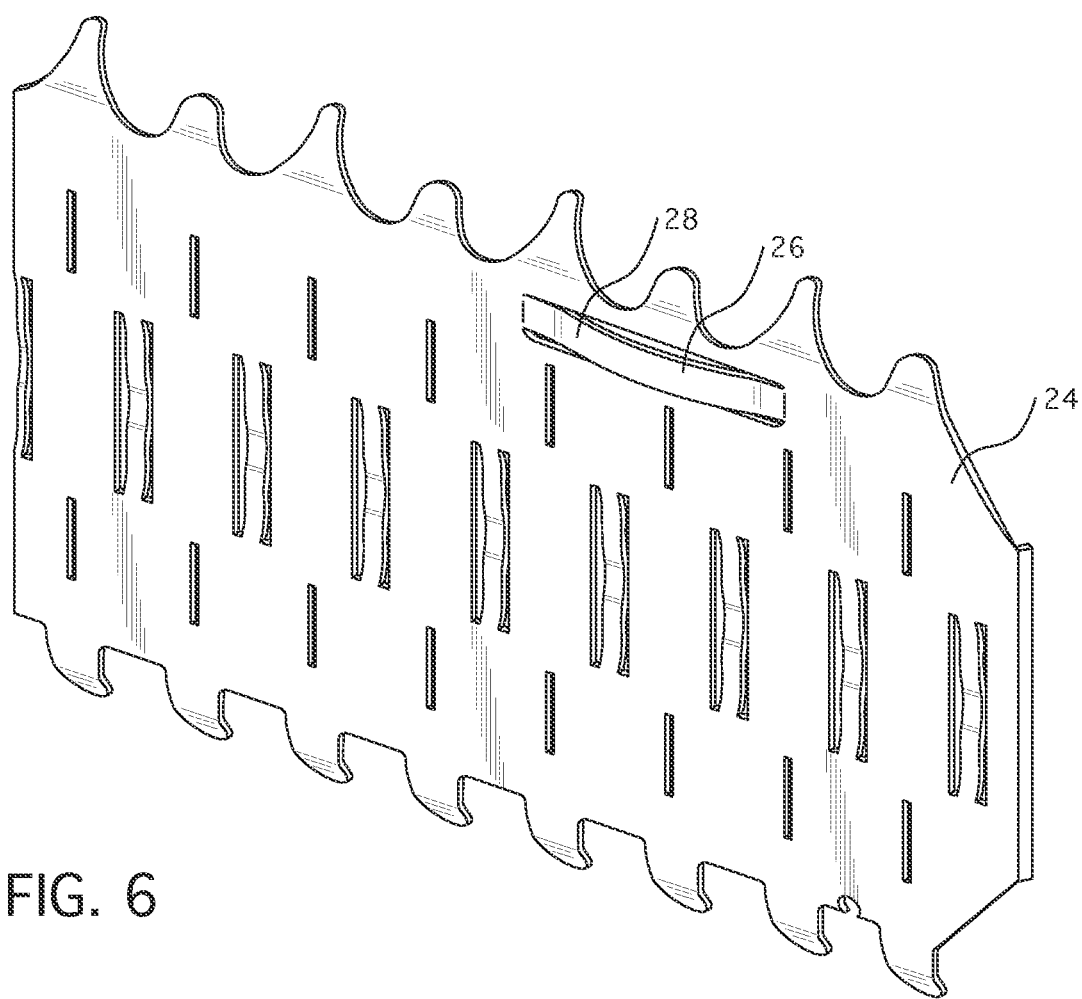
FIG. 6 is a perspective view of FIG. 4.
Figure 7:
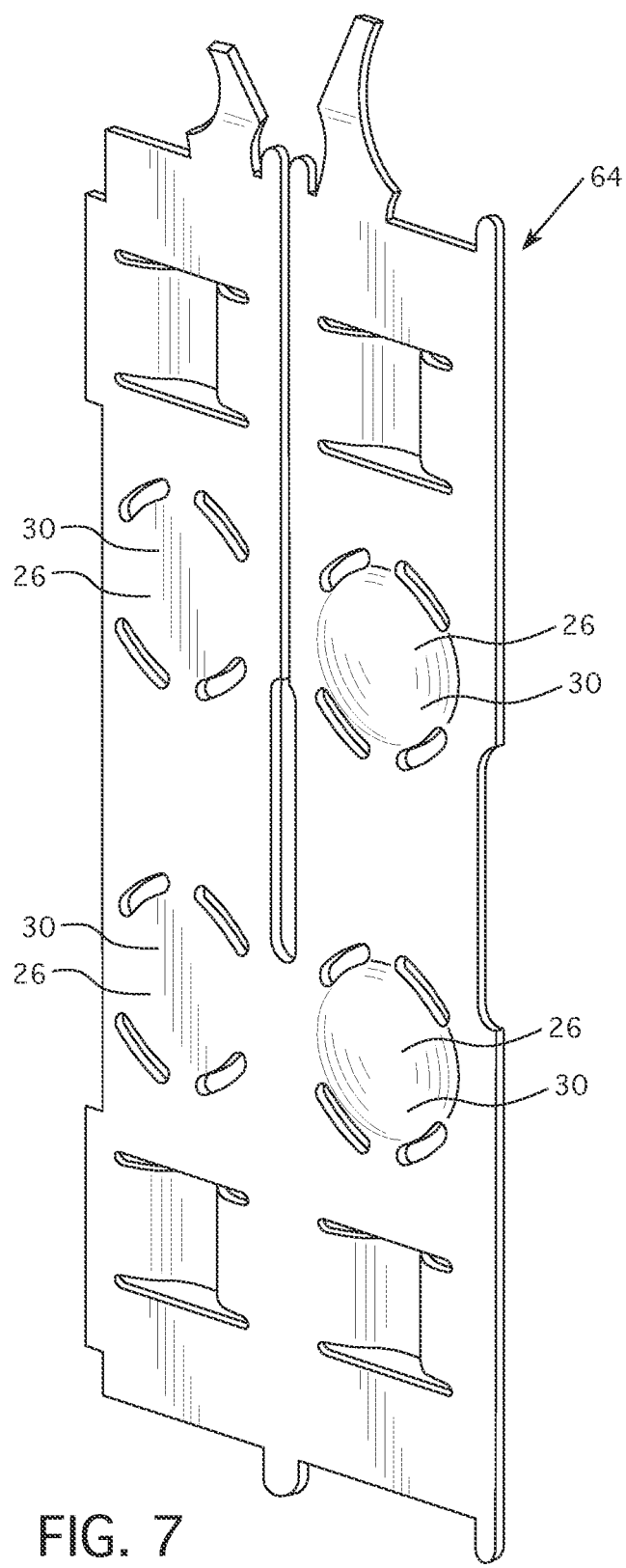
FIG. 7 is a perspective view of a second embodiment of the bimetallic spring of this invention formed in a circular disc configuration.
Figure 8:
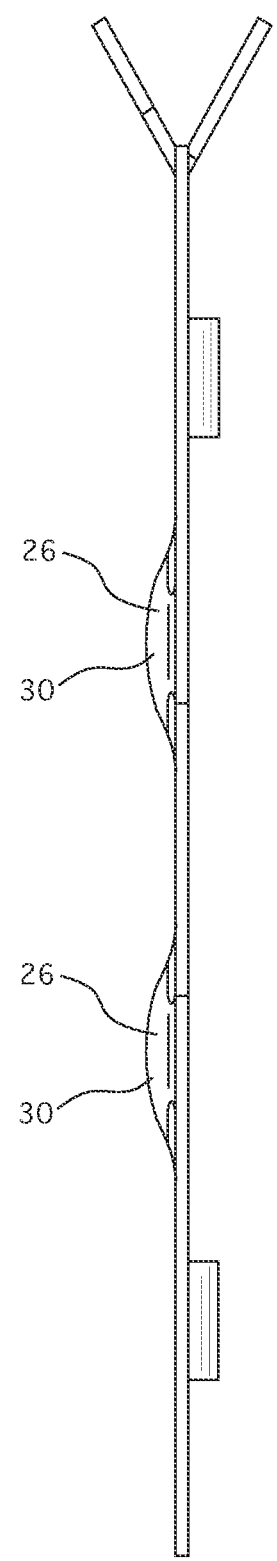
FIG. 8 is a side view of FIG. 7.
Figure 9:
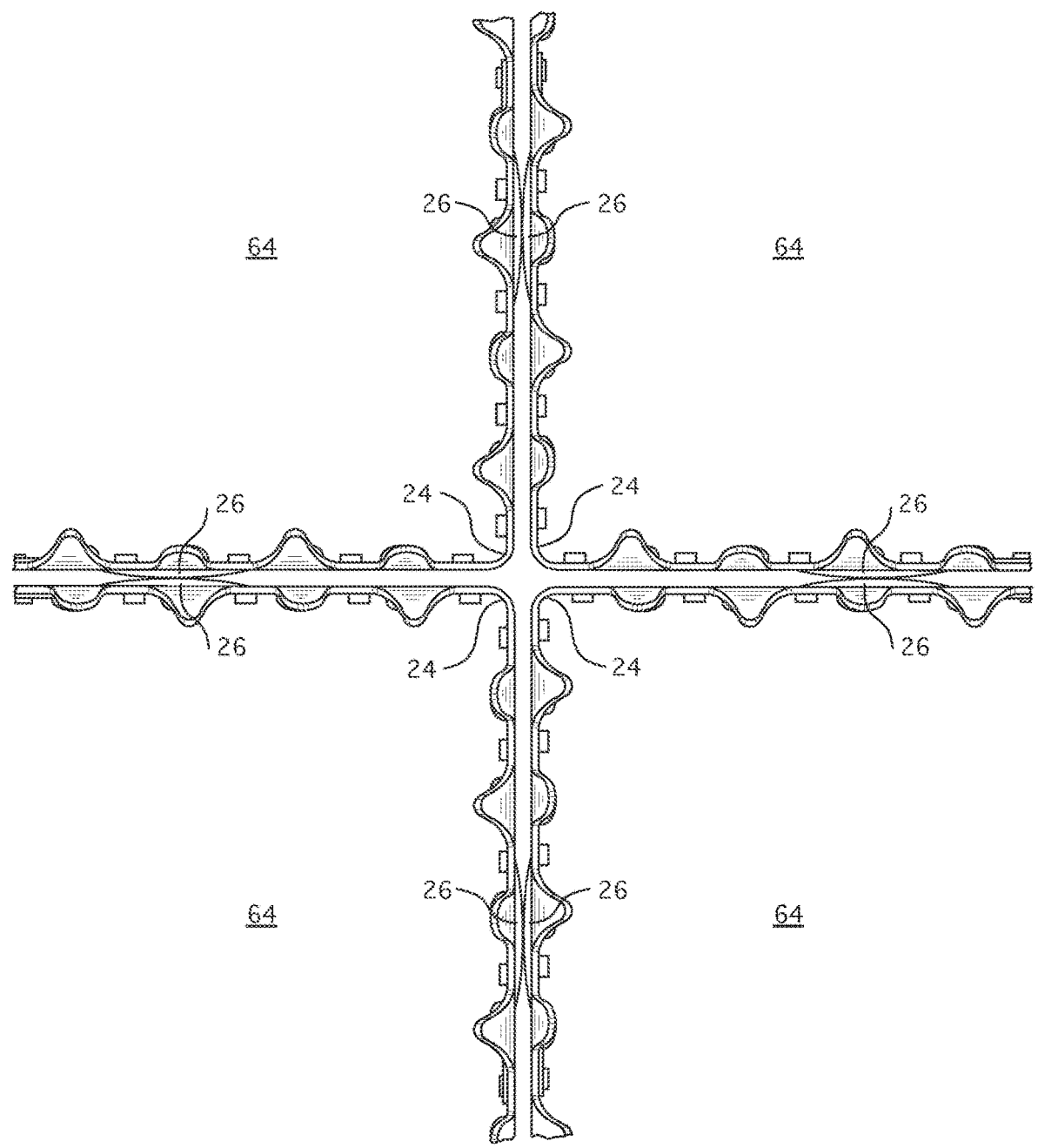
FIG. 9 is a plan view of four adjacent fuel assemblies at operating temperatures with their opposing springs in contact.
Figure 10:
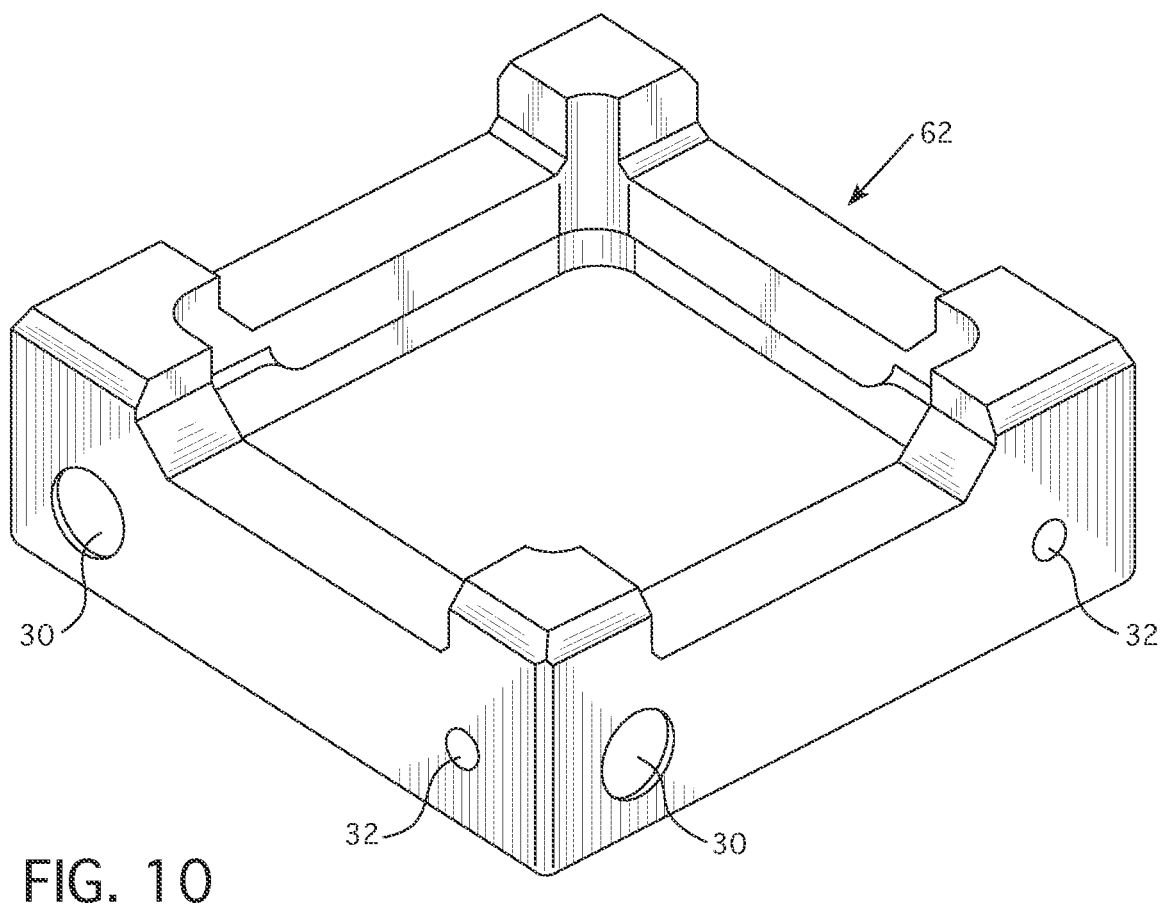
FIG. 10 is a perspective view of a portion of a top fuel assembly nozzle with a disc metallic spring shown in one corner of each side with a recess in the other corner to receive the forward portion of an opposing spring extending from an adjacent nozzle.
Figure 11:
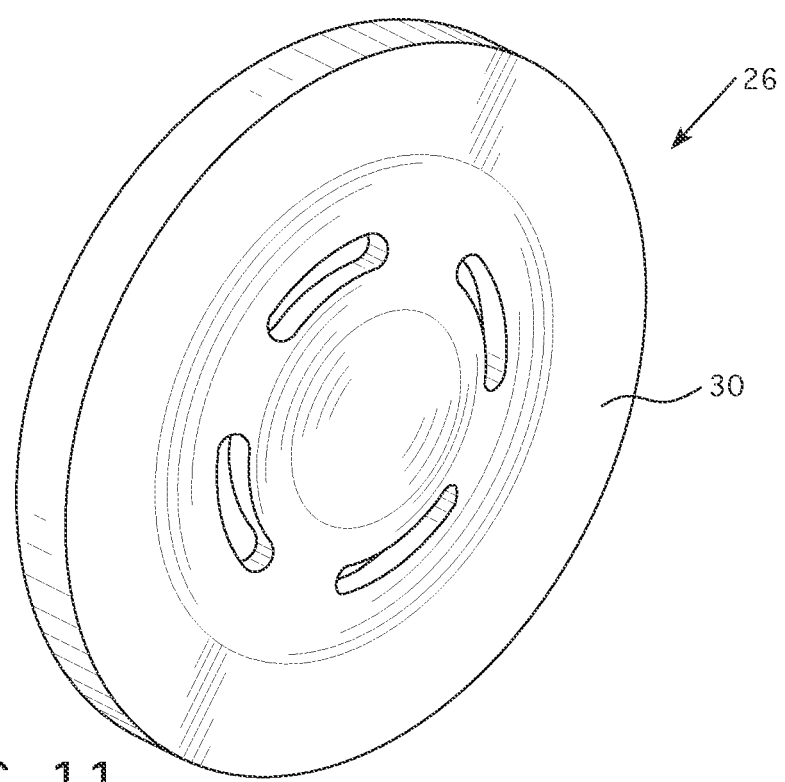
FIG. 11 is a perspective view of a disc bimetallic spring with optional relief openings.
Figure 12:
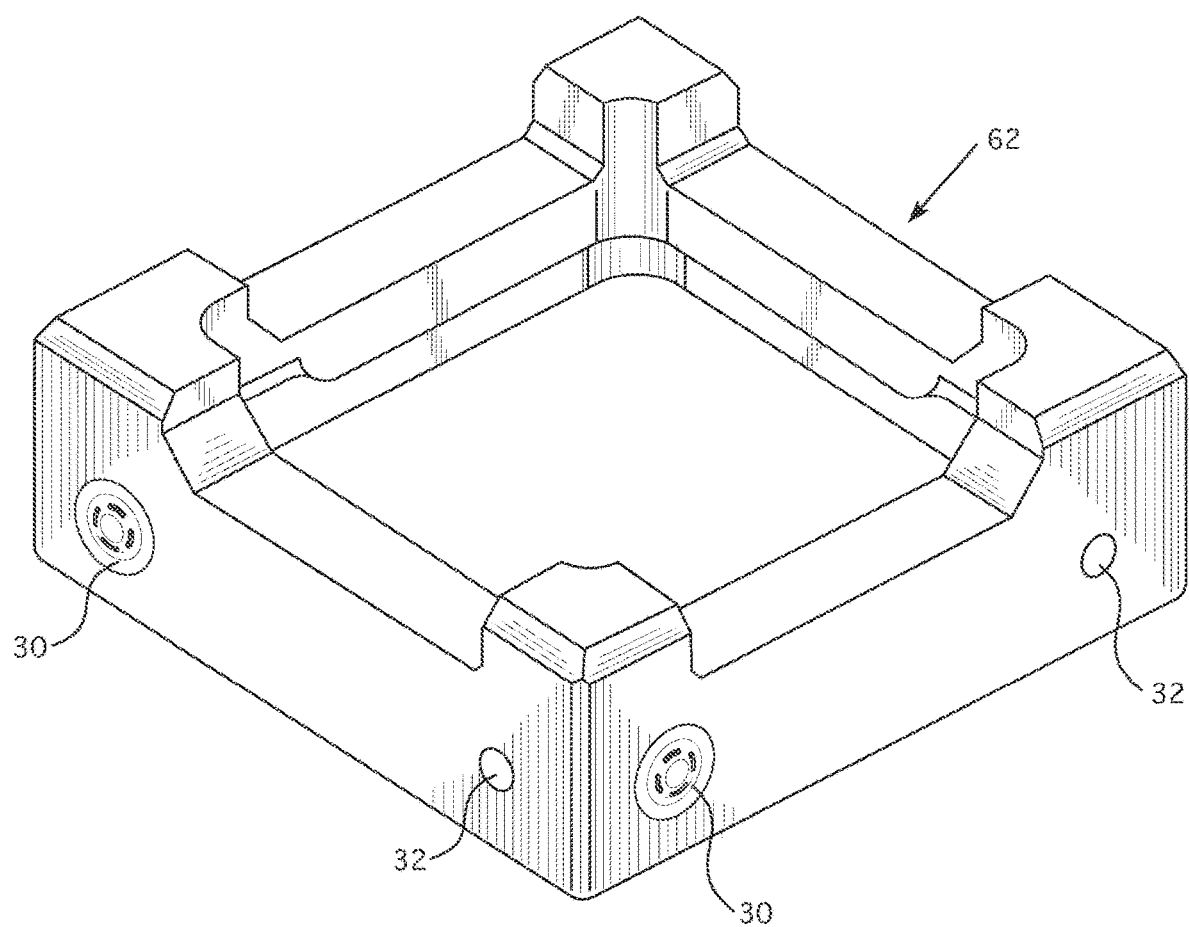
FIG. 12 is a perspective view of a portion of a top nozzle employing the embodiment of the bimetallic spring shown in FIG. 11.
Figure 13:
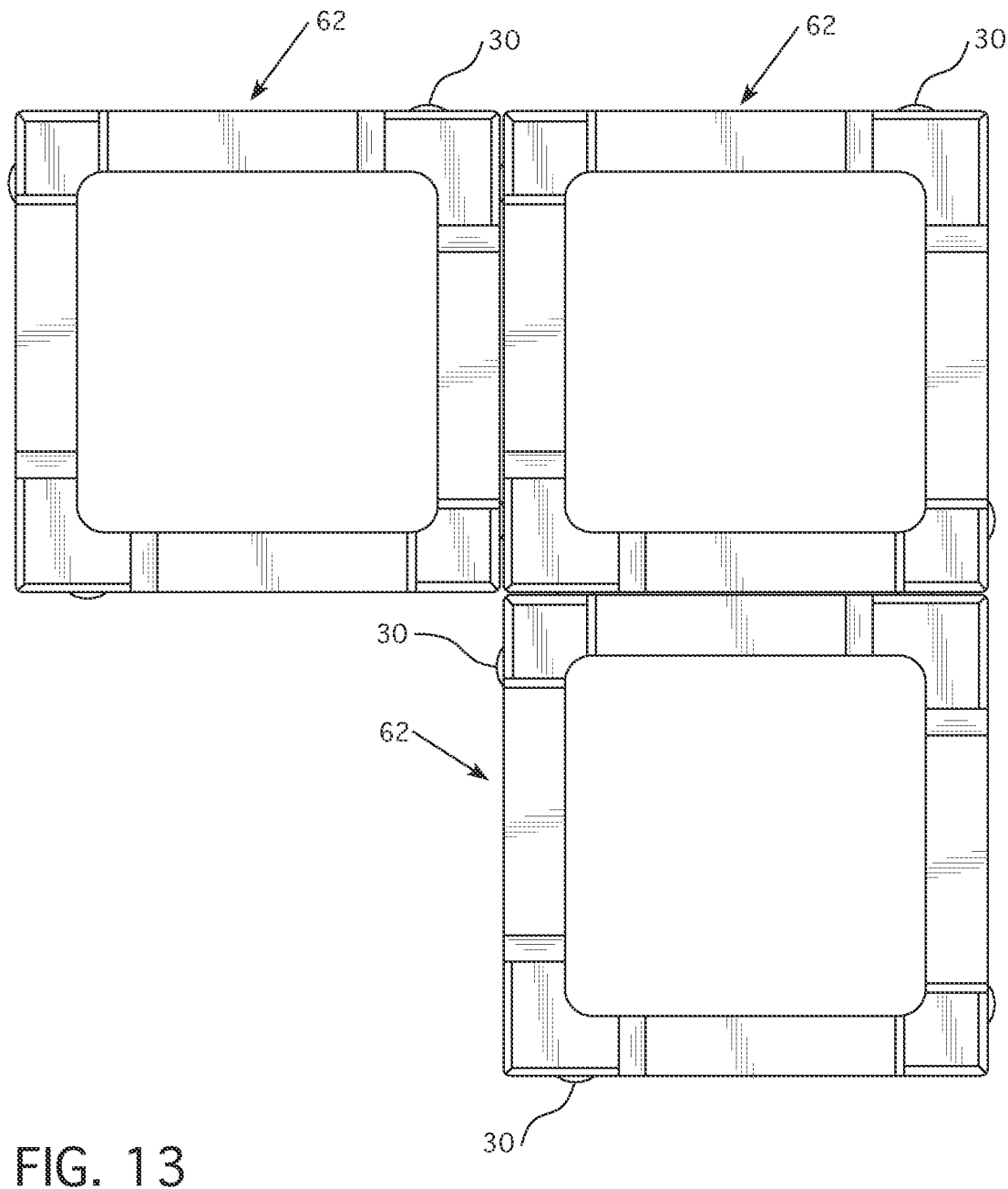
FIG. 13 is a plan view of three adjacent top nozzles.
Figure 14:
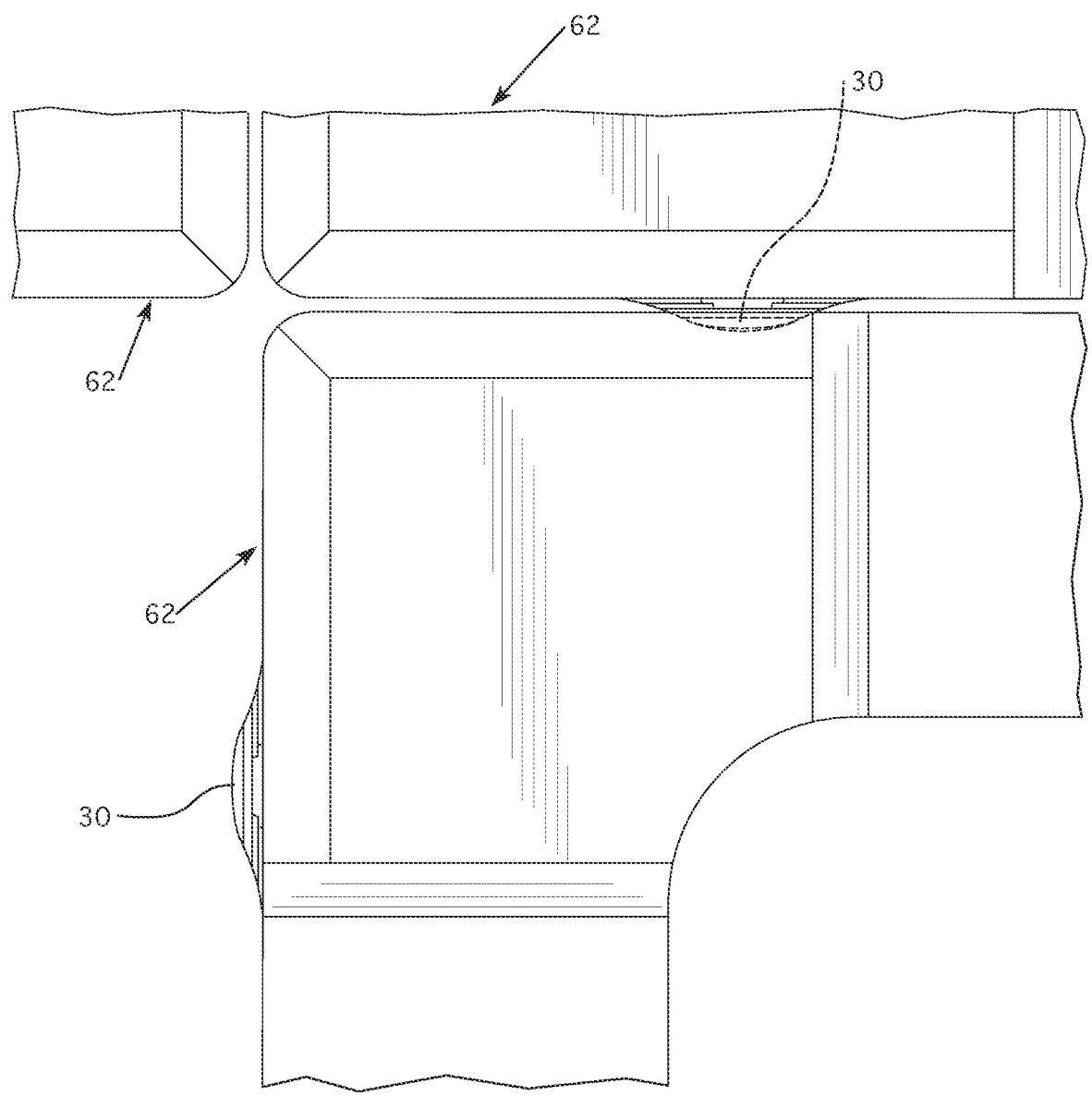
FIG. 14 is an enlarged plan view of FIG. 13.

The attached figures in FIGS. 3-14 show varying configurations of the bimetallic concept to attain different benefits. One embodiment of this invention is a fuel assembly 22 with a mid-grid with a bimetal protrusion spring 26 arrangement formed in an outer grid strap 24 shown in FIGS. 3-6. Any arrangement of these springs 26 could be present on each outer strap 24 (such as one in each corner as shown in the FIG. 9). A rectangular shaped spring/protrusion 28 will likely be oriented vertically to minimize concerns for fuel handling should the spring not return fully to the flat original shape or return beyond the outer strap envelope. However, the rectangular shaped spring may also be mounted horizontally and fall within this concept. The spring may also be of a circular shape 30 such as a "pop-out" disc or other configuration that result in the desired deflection and load capability as shown in FIGS. 7 and 8. The bimetal area may be a lamination attached mechanically or a coating on the base strap material. This grid spring 26 will provide the benefit of reducing or eliminating the fuel assembly gaps during operation to reduce seismic/LOCA (Loss Of Coolant Accident) impact loads, and to provide energy absorption during such accident conditions to prevent grid damage.

Another embodiment disclosed herein is a bimetallic protrusion spring attached to a fuel assembly top or bottom nozzle 62 and 58, or Inconel top or bottom grid. This feature would provide alignment benefits for conditions such as damaged upper core plate fuel assembly alignment pins that have been removed. The top nozzle 62 or other host component would support itself upon all adjacent nozzles 62 (or other like-adjacent components) with this feature, ensuring alignment with the intent of reducing or eliminating penalties for removed pins. This second feature may be on all the fuel assemblies or just the ones with damaged alignment. However, preferably it is on the fuel assemblies with damaged pins and the adjacent fuel assemblies have recesses 32 in which the springs can seat. Sample calculations for many of the arrangements are also available showing significant load capability can be attained depending on the feature geometry. Thus, this invention employs bimetallic features to provide either fuel assembly alignment benefits or improved fuel assembly response during seismic/LOCA accident conditions.

More specifically, one such feature is the top nozzle alignment spring shown in FIGS. 10-14. This bimetallic spring attached to a fuel assembly top nozzle would provide alignment benefits for conditions such as upper core plate fuel assembly alignment pins that have been damaged and removed. The top nozzle would support itself upon all adjacent nozzles with this feature, ensuring alignment with the intent of reducing or eliminating cut pin penalties that such plants must impose. This spring may be of varying shapes such as a rectangular beam 28 or circular disc 30 as shown in the figures. It may be attached with varying methods such as brazing, riveting, or welding. The spring may be fabricated from various materials or alloys, but will most likely be an INVAR™/Stainless combination to attain the desired deflection and load capability while facilitating attachment to the nozzle or other host component. INVAR™ is generally known as FeNi36 or 64FeNi.

Another concept feature is a typical outer grid strap 24 containing a bimetal material spring feature 26 as shown in FIGS. 3-11. The outer strap bimetal features would extend outside the nominal grid envelope at operating temperature due to the high expansion side of the material to reduce or eliminate the gap between fuel assemblies, allowing for support between adjacent assemblies. This support between adjacent fuel assemblies during operation would result in lower fuel assembly loads during Seismic/LOCA events. The features may be of long rectangular beam designs similar to grid springs, "pop out" disc shaped designs shown in FIGS. 7 and 8, or some other unique design shape needed to attain the desired deflection and load capability. The bimetallic spring features may only be needed at one or two mid-grid locations near the axial center of the fuel assembly. This would reduce any neutronic penalty due to the material used. The bimetal combination could consist of many materials, but for the purposes of doing sample calculations to determine the feasibility of the concepts, a bimetal laminate of INVAR™ as the low expansion material and a stainless steel variant as the high expansion material was considered. The bimetal feature may also be obtained by coating the base strap material with a low-to negative coefficient of thermal expansion material. The basic feature could also be joined to the grid similar to the top nozzle feature described above.

Significant load capability can be designed into the features for Seismic/LOCA load absorption. This feature can also be used in reverse, i.e., wherein the spring retracts at operating temperature and is in an expanded state below operating temperature to facilitate alignment of the fuel assemblies when the upper core plate is being installed.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear fuel assembly having an elongated dimension and comprising: a plurality of interconnected components wherein at least some of the interconnected components comprise:
    a top nozzle;
    a bottom nozzle;
    a plurality of guide thimbles extending between the top nozzle and the bottom nozzle;
    a plurality of fuel rods extending between the top nozzle and the bottom nozzle; and
    a plurality of grids arranged in a tandem spaced relationship that extends between the top nozzle and the bottom nozzle along the elongated dimension, with each of the grids having a plurality of cells some of which support fuel rods and others through which the guide thimbles respectively pass and attach to the plurality of grids;
    wherein at least one grid of the plurality of grids comprises a peripheral surface area that extends in a plane a distance along the elongated dimension; and
    wherein the at least one grid of the plurality of grids comprises a bimetallic spring that moves between a first and second position relative to the plane as the fuel assembly transitions from a reactor core shutdown temperature to a reactor core operating temperature, with the second position placing the bimetallic spring in contact with a corresponding grid of an adjacent nuclear fuel assembly located in a reactor core.

2. The nuclear fuel assembly of claim 1 wherein the bimetallic spring has an elongated dimension and the elongated dimension of the bimetallic spring extends transverse to the elongated dimension of the nuclear fuel assembly.

3. The nuclear fuel assembly of claim 2 wherein the bimetallic spring is continuous and extends across several of the grid cells.

4. The nuclear fuel assembly of claim 1 wherein the at least one grid of the plurality of grids is a mid-grid.

5. The nuclear fuel assembly of claim 1 wherein the at least one grid of the plurality of grids is one of an upper grid or a lower grid or both an upper grid and a lower grid.

6. The nuclear fuel assembly of claim 1 wherein the bimetallic spring is configured in a rectangular shape having an elongated dimension.

7. The nuclear fuel assembly of claim 6 wherein the elongated dimension of the bimetallic spring extends substantially parallel to the elongated dimension of the nuclear fuel assembly.

8. The nuclear fuel assembly of claim 1 wherein the bimetallic spring comprises stainless steel and either FeNi36 or 64FeNi.

9. The nuclear fuel assembly of claim 8 wherein the bimetallic spring is formed on each corner of the at least one grid of the plurality of grids.

10. The nuclear fuel assembly of claim 1 wherein the peripheral surface area of the at least one grid of the plurality of grids comprises a base metal, and wherein the bimetallic spring is formed by coating the base metal with a material having a lower coefficient of thermal expansion than the base metal.

11. The nuclear fuel assembly of claim 1 wherein the bimetallic spring is formed on a corner of the at least one grid of the plurality of grids.

12. The nuclear fuel assembly of claim 1 wherein the bimetallic spring does not protrude outwardly from the plane in the first position and protrudes outwardly from the plane in the second position to contact the corresponding grid of the adjacent nuclear fuel assembly.

13. The nuclear fuel assembly of claim 1 wherein the bimetallic spring is configured in a round disc shape.

14. The nuclear fuel assembly of claim 13 wherein the bimetallic spring has a dome when exposed to the reactor core operating temperature.

15. The nuclear fuel assembly of claim 13 further comprising relief holes spaced around the circumference of the bimetallic spring.

16. The nuclear fuel assembly of claim 1 wherein the bimetallic spring comprises a base material coated with a material having a different coefficient of thermal expansion than the base material.

17. The nuclear fuel assembly of claim 1 wherein the bimetallic spring comprises a lamination of a first material and a second material, wherein the first material has a different coefficient of thermal expansion than the second material.

* * * * *